(12) United States Patent
Lee et al.

(10) Patent No.: US 10,956,588 B2
(45) Date of Patent: Mar. 23, 2021

(54) SERVER, ELECTRONIC DEVICE, AND METHOD FOR PROCESSING IMAGE BY ELECTRONIC DEVICE

(71) Applicant: Samsung Electronics Co., Ltd., Gyeonggi-do (KR)

(72) Inventors: Kyu-Ho Lee, Seoul (KR); Yun-Hong Choi, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 20 days.

(21) Appl. No.: 15/781,195

(22) PCT Filed: Dec. 15, 2016

(86) PCT No.: PCT/KR2016/014746
§ 371 (c)(1),
(2) Date: Jun. 4, 2018

(87) PCT Pub. No.: WO2017/105113
PCT Pub. Date: Jun. 22, 2017

(65) Prior Publication Data
US 2018/0357435 A1 Dec. 13, 2018

(30) Foreign Application Priority Data

Dec. 15, 2015 (KR) .......................... 10-2015-0179078

(51) Int. Cl.
*G06F 21/00* (2013.01)
*G06F 21/62* (2013.01)
(Continued)

(52) U.S. Cl.
CPC ........ *G06F 21/6209* (2013.01); *G06F 21/606* (2013.01); *G06F 21/6218* (2013.01);
(Continued)

(58) Field of Classification Search
CPC .. H04N 1/4446; H04N 1/00867; H04N 1/446; H04N 1/32144; H04N 1/448;
(Continued)

(56) References Cited

U.S. PATENT DOCUMENTS 8,453,260 B2 * 5/2013 Lee ..................... G03G 15/5066
726/34
9,448,704 B1 * 9/2016 Belhumeur ........... G06F 3/0481
(Continued)

FOREIGN PATENT DOCUMENTS

| CN | 101118586 A | 2/2008 |
| CN | 102473283 A | 5/2012 |

(Continued)

OTHER PUBLICATIONS

Su et al., "Content-Based Image Retrieval on Reconfigurable Peer-to-Peer Networks", International Symposium on Biometrics and Security Technologies, Date of Conference: Jul. 2-5, 2013.*

(Continued)

*Primary Examiner* — Morshed Mehedi
(74) *Attorney, Agent, or Firm* — Cha & Reiter, LLC

(57) ABSTRACT

An electronic device and a method for processing an image by the electronic device according to various embodiments of the present invention are provided. The method may comprise: generating password information for a first image using security information of a user; changing the first image to a second image using the generated password information; and transmitting the second image and the password information in response to a transmission request of the first image. Various other embodiments may be available.

15 Claims, 13 Drawing Sheets

(51) Int. Cl.
- *G06F 21/60* (2013.01)
- *H04N 1/00* (2006.01)
- *H04N 1/44* (2006.01)
- *H04N 21/2347* (2011.01)
- *H04N 21/235* (2011.01)
- *H04N 1/32* (2006.01)

(52) U.S. Cl.
CPC ..... *H04N 1/00867* (2013.01); *H04N 1/00872* (2013.01); *H04N 1/32144* (2013.01); *H04N 1/442* (2013.01); *H04N 1/444* (2013.01); *H04N 1/446* (2013.01); *H04N 1/448* (2013.01); *H04N 1/4413* (2013.01); *H04N 1/4446* (2013.01); *H04N 1/4486* (2013.01); *H04N 21/235* (2013.01); *H04N 21/2347* (2013.01); *H04N 2201/325* (2013.01); *H04N 2201/3225* (2013.01); *H04N 2201/3242* (2013.01); *H04N 2201/3253* (2013.01); *H04N 2201/3263* (2013.01); *H04N 2201/3266* (2013.01); *H04N 2201/3271* (2013.01)

(58) Field of Classification Search
CPC ............ H04N 21/235; H04N 21/2347; H04N 1/4486; H04N 1/444; H04N 1/442; H04N 1/4413; H04N 1/00872; G06F 21/6218; G06F 21/606
See application file for complete search history.

(56) References Cited

U.S. PATENT DOCUMENTS

| | | | |
|---|---|---|---|
| 9,888,166 B2* | 2/2018 | Winer | H04N 5/23293 |
| 2004/0017918 A1 | 1/2004 | Nicolas | |
| 2004/0044894 A1* | 3/2004 | Lofgren | G06T 1/0028 713/176 |
| 2004/0070616 A1* | 4/2004 | Hildebrandt | G06F 21/84 715/764 |
| 2008/0031446 A1* | 2/2008 | Suga | G11B 20/00086 380/44 |
| 2008/0129758 A1* | 6/2008 | Fox | H04N 1/32128 345/661 |
| 2009/0245511 A1 | 10/2009 | Nakagata et al. | |
| 2009/0319897 A1* | 12/2009 | Kotler | G06T 11/60 715/711 |
| 2010/0251109 A1* | 9/2010 | Jin | H04N 1/00153 715/273 |
| 2010/0322464 A1 | 12/2010 | Beak | |
| 2011/0050602 A1 | 3/2011 | Jeong et al. | |
| 2011/0134325 A1* | 6/2011 | Ahn | H04N 21/4263 348/569 |
| 2012/0076297 A1* | 3/2012 | Koziol | G06T 11/60 380/243 |
| 2012/0090036 A1 | 4/2012 | Kang et al. | |
| 2012/0151601 A1 | 6/2012 | Inami et al. | |
| 2013/0004090 A1* | 1/2013 | Kundu | G06K 9/00771 382/232 |
| 2013/0153662 A1* | 6/2013 | Narasa Prakash | G06K 7/1486 235/462.07 |
| 2014/0173272 A1 | 6/2014 | Kim | |
| 2016/0050341 A1* | 2/2016 | Erdler | H04N 1/444 380/245 |
| 2017/0300707 A1* | 10/2017 | Wu | G06F 21/60 |

FOREIGN PATENT DOCUMENTS

| | | |
|---|---|---|
| CN | 102567448 A | 7/2012 |
| CN | 102742291 A | 10/2012 |
| CN | 103605928 A | 2/2014 |
| CN | 103782584 A | 5/2014 |
| JP | 2003-87632 A | 3/2003 |
| KR | 10-2005-0021468 A | 3/2005 |
| KR | 10-0880243 B1 | 1/2009 |
| KR | 10-2011-0021380 A | 3/2011 |
| KR | 10-2012-0102972 A | 9/2012 |
| KR | 10-2013-0085473 A | 7/2013 |
| KR | 10-2014-0009708 A | 1/2014 |
| WO | 2012/047064 A2 | 4/2012 |
| WO | 2014/173588 A1 | 10/2014 |
| WO | 2015/131713 A1 | 9/2015 |

OTHER PUBLICATIONS

European Search Report dated Jul. 16, 2018.
European Search Report dated Jan. 23, 2020.
Chinese Search Report dated Feb. 25, 2020.

* cited by examiner

SERVER, ELECTRONIC DEVICE, AND METHOD FOR PROCESSING IMAGE BY ELECTRONIC DEVICE

CLAIM OF PRIORITY

This application is a National Phase Entry of PCT International Application No. PCT/KR2016/014746, which was filed on Dec. 15, 2016 and claims a priority to Korean Patent Application No. 10-2015-0179078, which was filed on Dec. 15, 2015, the contents of which are incorporated herein by reference.

TECHNICAL FIELD

Various embodiments of the present disclosure relate to a server, an electronic device, and a method for processing an image by an electronic device.

BACKGROUND ART

Various electronic devices that are recently used have been developed to provide various functions associated with images. For example, electronic devices (e.g., a smartphone or a server) can store images and can be controlled to output the stored images.

Various electronic devices that are recently used have been developed to provide various functions. These electronic devices are equipped with a display so that various functions can be more effectively used. For example, recently, smartphones have been equipped with a display (e.g., a touch screen) that is disposed on the front to sense a touch.

Further, various applications (e.g., also called 'App') can be installed and executed in electronic devices. Various input devices (e.g., a touch screen, a button, a mouse, a keyboard, and a sensor) can be used to execute and control the applications in electronic devices.

DETAILED DESCRIPTION OF THE INVENTION

Technical Problem

An electronic device and a server can receive and store images from another electronic device. The stored images can be output when another user unlocks or accesses the electronic device with the account of the server.

According to various embodiments of the present disclosure, a server, an electronic device, and a method for processing an image by an electronic device can blur an image requested to be transmitted from the outside and then transmit the image with encoding information for decoding the blurred image. An electronic device that receives the encoded image can receive security information of a user, and can restore the blurred image into the original image and output the original image by determining whether the security information correspond to the encoding image of the received image.

Technical Solution

An electronic device according to various embodiments of the present disclosure includes: a display; and a processor, in which the processor may create code information for a first image using security information of a user, change the first image into second image using the created code information, and transmit the second image and the code information in response to a request to transmit the first image.

A server according to various embodiments of the present disclosure may include a memory storing at least one encoded image and encoding information of the image and a processor. The processor may output the stored encoded image by recognizing identification information of an input account of the server and security information of the identification information, receive security information of a user corresponding to a second image when recognizing that the second image has been selected, change the second image into first image using code information corresponding to the security information of a user, and output the first image.

A method of processing an image in an electronic device according to various embodiments of the present disclosure may include: creating code information for a first image using security information of a user; changing the first image into a second image using the created code information; and transmitting the second image and the code information in response to a request to transmit the first image.

A method of processing an image by a server according to various embodiments of the present disclosure may include: outputting the stored encoded image by recognizing identification information of an input account of the server and security information of the identification information; receiving security information of a user corresponding to a second image when recognizing that the second image has been selected; changing the second image into the first image using code information corresponding to the security information of a user; and outputting the first image.

Advantageous Effects

The electronic device and the method for processing an image by an electronic device according to various embodiments of the present disclosure, it is possible to transmit a blurred image by encoding the image that is transmitted to the outside and to process and output the image such that the image cannot be recognized by other users even if the image transmitted to the outside is opened.

MODE FOR CARRYING OUT THE INVENTION

Figure 1:
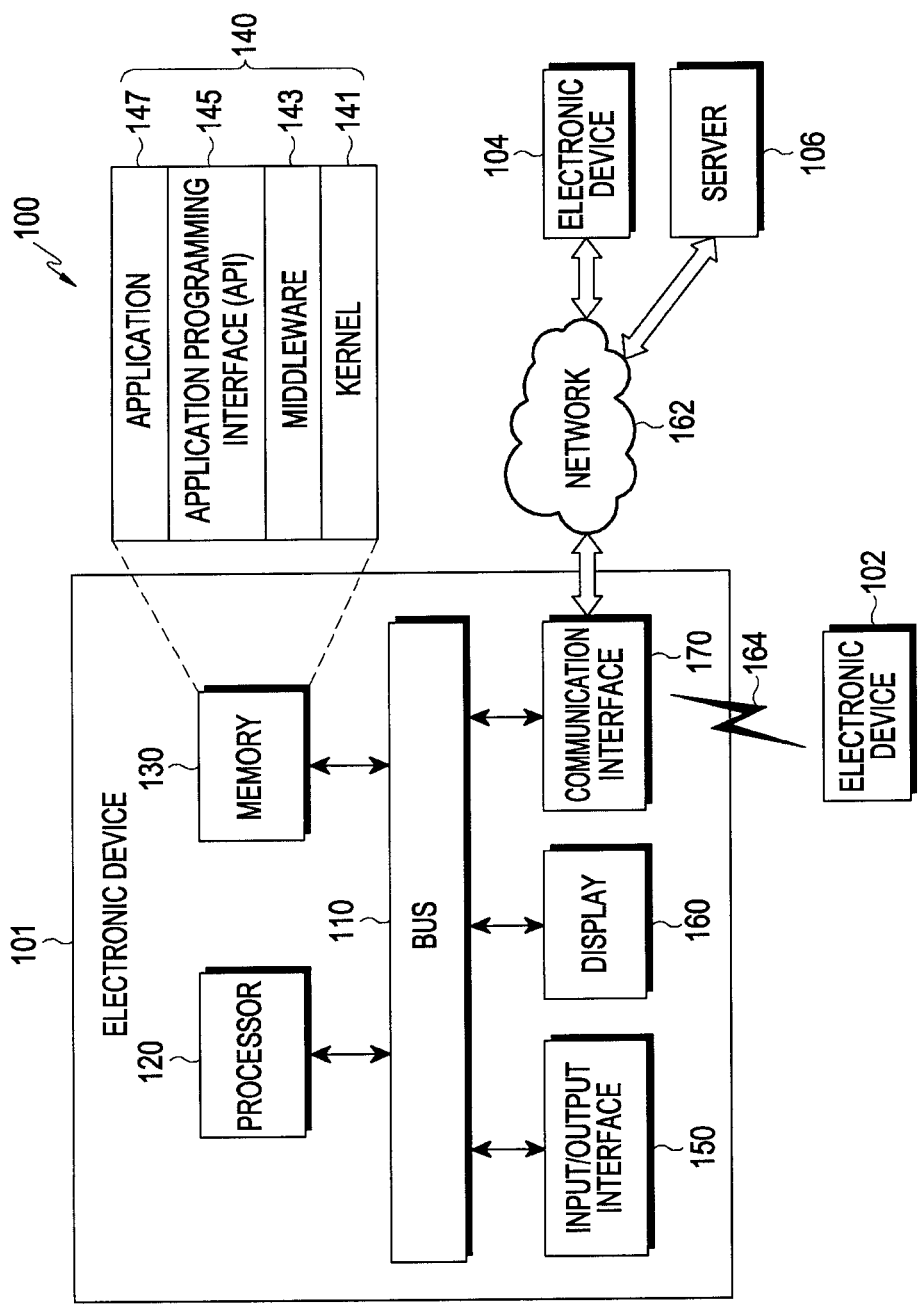
FIG. 1 is a diagram showing an example of a network environment in accordance with various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains.

Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, eve the terms defined herein may not be construed to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to various embodiments of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device and a method of processing data by an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 is a diagram showing an example of a network environment according to various embodiments of the present disclosure.

Referring to FIG. 1, a network environment 100 may include an electronic device 101, at least one electronic device (e.g., a first electronic device 102 or a second electronic device 104), or a server 106. These components may be connected through a network 162 or may be connected to the electronic device 101 through a communication interface 170 of the electronic device 101.

The electronic device 101 may include a bus 110, a processor 120, a memory 130, an I/O interface 150, a display 160, and a communication interface 170. In another embodiment, the electronic device 101 may not include at least one of the components or may additionally include other components.

The bus 110, for example, may include a circuit that connects the components (110 to ~170) and transmits communications (for example, control messages and/or data) among the components.

The processor 120 may include one or more of a Central Processor (CPU), an Application Processor (AP), and a Communication Processor (CP). The processor 120, for example, can perform calculation or data processing about control and/or communication of one or more other components of the electronic device 101.

In accordance with various embodiments of the present disclosure, the processor 120 can mosaic or blur at least one image. For example, the at least one image may include an image that is transmitted to an external device of the electronic device 101 (e.g., the first electronic device 102, the second electronic device 104, or the server 106) and the external device may be various cloud servers or external storage mediums that can store images.

In accordance with various embodiments of the present disclosure, the processor 120 can recognize that the security information of a user is input through the I/O interface 150 and can encode at least one image or decode an encoded image, using the security information. For example, the encoded image can be changed into a blurred image and then output.

The memory 130 may include a volatile and/or nonvolatile memory. The memory 130 can store, for example, instructions or data related to at least one other component of the electronic device 101. According to an embodiment, the memory 130 can store software and/or a program 140. For example, the program 140 may include a kernel 141, a middleware 143, an Application Programming Interface (API) 145, and/or an application program (or an "application") 147. At least some of the kernel 141, middleware 143, and API 145 may be referred to as an Operating System (OS).

The kernel 141, for example, can control or manage system resources (for example, the bus 110, processor 120, or memory 130) that are used to perform operations or functions that are implemented by other programs (for example, the middleware 143, the API 145, or the application program 147). Further, the kernel 141 can provide an interface that can control or manage system resources, by accessing individual components of the electronic device 101 via the middleware 143, API 145, or application program 147.

The middleware 143, for example, can function as a relay so that the API 145 or application program 147 can transmit and receive data by communicating with the kernel 141.

Further, the middleware 143 can process one or more work requests received from the application program 147 in order of priority. For example, the middleware 143 can give a priority to be able to use system resources (for example, the bus 110, the processor 120, or the memory 130) of the electronic device 101 to at least one of the application programs 147. For example, the middleware 143 can perform scheduling or load balance the work requests by processing the work requests in accordance with the priority.

The API 145, which is an interface for the application program 147 to control a function provided to the kernel 141 or the middleware 143, for example, may include at least one interface or function (for example, instruction) for file control, window control, image control, or text control.

The I/O interface 150, for example, can function as an interface that can transmit instructions or data input from a user or external devices to other component(s) of the electronic device 101. The I/O interface 150 can output instructions or data received from other component(s) of the electronic device 101 to a user or other external devices.

For example, the display 160 may include a Liquid Crystal Display (LCD), a Light Emitting Diode (LED) display, an Organic Light Emitting Diode (OLED) display, or a Micro Electronic Mechanical System (MEMS) display, or an electronic paper display. The display 160, for example, can display various contents (for example, a text, an image, a video, an icon, or a symbol) to a user. The display 160 may include a touch screen and, for example, can receive touching, gesturing, approaching, or hovering input by an electronic pen or a part of the body of a user.

The communication interface 170. for example, can set communication between the electronic device 101 and an external device (for example, a first external electronic device 102, a second external electronic device 104, or a server 106). For example, the communication interface 170 can be connected to the network 162 and can communicate with an external device (for example, the second external electronic device 104 or the server 106) through wireless communication or wire communication.

The wireless communication, for example, which is a cellular communication protocol, for example, may use at least one of LTE, LTE-A (LTE Advance), Code Division Multiple Access (CDMA), Wideband CDMA (WCDMA), Universal Mobile Telecommunications System (UMTS), Wireless Broadband (WiBro), and Global System for Mobile Communications (GSM). The wireless communication, for example, may include near field communication 164. The near field communication 164, for example, may include at least one of Wireless Fidelity (WiFi), Bluetooth, Near Field Communication (NFC), and Global Navigation Satellite System (GNSS). GNSS, for example, may include, depending on the use area or bandwidth etc., a Global Positioning System (GPS), a Global Navigation Satellite System (Glonass), a Beidou Navigation Satellite System (hereafter, referred to as "Beidou"), and Galileo, the European global satellite-based navigation system. In the following description, "GPS" may be interchangeably used with "GNSS". Wire communication, for example, may include at least one of a Universal Serial Bus (USB), a High Definition Multimedia Interface (HDMI), an RS-232 (Recommended Standard-232), and a Plain Old Telephone Service (POTS). The network 162 may include at least one of telecommunication networks, for example, a computer network (for example, LAN or WAN), the internet, and a telephone network.

The first and second external electronic devices 102 and 104 may be devices that are the same as or different from the electronic device 101. According to an embodiment, the server 106 may include a group of one or more servers. According to various embodiments, all or some of operations that are performed by the electronic device 101 may be performed by another electronic device or a plurality of other electronic devices (for example, the electronic devices 102 and 104 or the server 106). According to an embodiment, when the electronic device 101 has to perform a function or service automatically or due to a request, the electronic device 101 may request at least partial function related to the function or service to another device (for example, the electronic devices 102 and 104 or the server 106) additionally or instead of performing the function or service by itself. Another electronic device (for example, the electronic devices 102 and 104 or the server 106) can perform the requested function or the additional function and transmit the result to the electronic device 101. The electronic device 101 can provide the requested function or service on the basis of the received result or by additionally processing the received result. To this end, for example, cloud computing, distributed computing, or client-server computing may be used.

Figure 2:
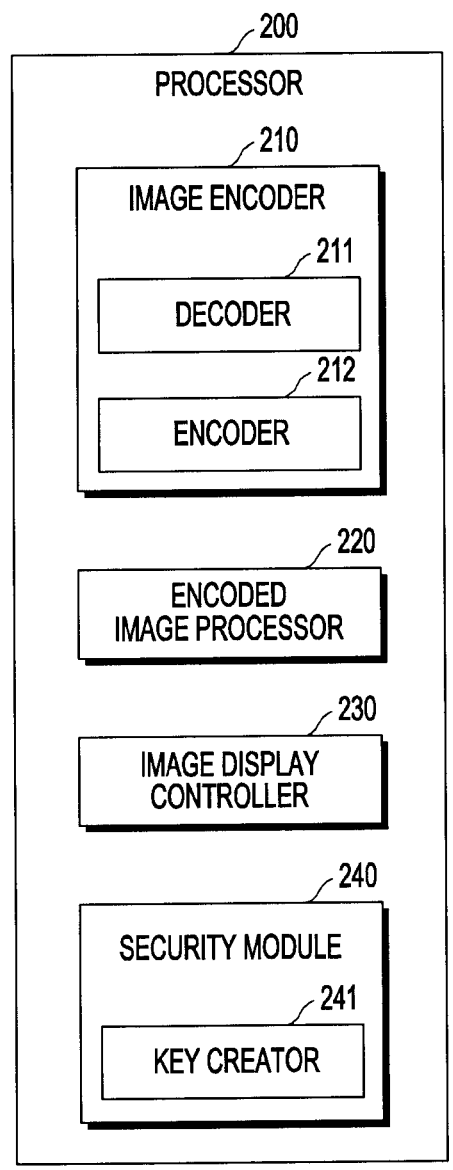
FIG. 2 is a block diagram showing an example of a processor structure of an electronic device that processes images in accordance with various embodiments of the present disclosure.

FIG. 2 is a block diagram showing an example of a processor structure of an electronic device that processes images in accordance with various embodiments of the present disclosure.

Referring to FIG. 2, the processor 200 may include an image encoder 210, an encoded image processor 220, an image display controller 230, or a security module 240. At least one of these components may be changed or removed or may be configured to perform operations related to processing images.

The image encoder 210 may include a decoder 211 or an encoder 212 and may include various components that perform operations for encoding or decoding images.

The decoder 211 can decode encoded images. For example, when at least one image is selected by a user, the processor 200 can control a specific image to be decoded by the decoder 211 by checking the metadata of the selected image.

In accordance with various embodiments of the present disclosure, the field of the metadata of an image may include an encoded-or-not field showing that the image has been encoded, an encoding key field including key information used for encoding, or an encoding way field showing what method (e.g., steganography) has been used for encoding.

The encoder 212 can encode an image, using an encoding key that is stored in advance or created by the key creator 241. For example, when an electronic device including the processor 200 is requested to transmit at least one image to the outside, the processor 200 can control the image to be encoded by the encoder 212.

In accordance with various embodiments of the present disclosure, the encoded image processor 220 can create a second image obtained by changing the size or shape of a first image requested to be encoded, and can mosaic or blur the created second image. For example, the second image may be a thumbnail image for the first image and can be displayed to shows that the first image is included on various application images.

In accordance with various embodiments of the present disclosure, the operation of blurring an image can divide the image into sections having a predetermined pixel value (e.g., 30 px) and give predetermined colors to the divided sections so that other user cannot recognize the image. The divided sections may be set in various shapes (e.g., a hexagon).

In accordance with various embodiments of the present disclosure, the unit of the pixel value (px) may be various units (e.g., inch, millimeter) that can show the sizes of the pixels.

In accordance with various embodiments of the present disclosure, the operation of mosaicking an image can divide the image into predetermined sizes and process the divided sections through an image effect filter. For example, the image effect filter may be various filters that can process an image by setting the texture, color, contrast, and definition of a specific section of the image.

The image display controller 230 can control a symbol for an encoded image. For example, the sign may include a word (e.g., 'locked') or an icon (e.g., the shape of a lock) showing that an image has been encoded, and various signs that can discriminate a corresponding image from other images by emphasizing the edge or color of the corresponding image.

The security module 240 may include the key creator 241 and can manage or store security information that is input by a user to encode or decode an encoded image. For example, the security information may be various types of information for encoding an image, logging in with an account, or decoding an encoded image such as biological information (e.g., the iris, the number of heartbeats, and the amount of blood sugar), a password, and pattern information.

The key creator 241 can create a password key for encoding an image or decoding an encoded image, using the security information of a user.

When an image to be decoded or encoded is checked, the security module 240 can determine whether security information input from a user corresponds to security information stored in advance or the encoding information of the image and then transmit the determination result to the image encoder 210. For example, the image encoder 210 can determine whether to encode an image requested to be transmitted from the outside or whether to decode an image selected by a user, on the basis of the determination result.

In accordance with various embodiments of the present disclosure, when the security information of a user for a first image is input, the security module 240 can decode the first image into the original image by changing the security information in accordance with a predetermined program and then inputting the changed information to the encoding key included in the first image. For example, the security information of a user may be received after changed by the predetermined program and the security module 240 can check the original security information by changing again the changed and transmitted security information.

In accordance with various embodiments of the present disclosure, the security module 240 can manage code information to be included in a mosaicked or blurred image. For example, the code information may include an encoding method, security information, or key information that is needed for decoding a mosaicked or blurred image into the original image.

In accordance with various embodiments of the present disclosure, the security module 240 can manage code information for each of image groups and the image groups may be created by setting by user's setting or may be classified in accordance with the positions where the images were taken or features included in the images. For example, when the image encoder 210 requests operation related to encoding of an image, the security module 240 can check corresponding image or image group information and then transmit a corresponding encoding method or key information to the image encoder 210.

In accordance with various embodiments of the present disclosure, an image encoded by the processor 200 may include a mosaicked or blurred image and encoding information of the image.

Figure 3:
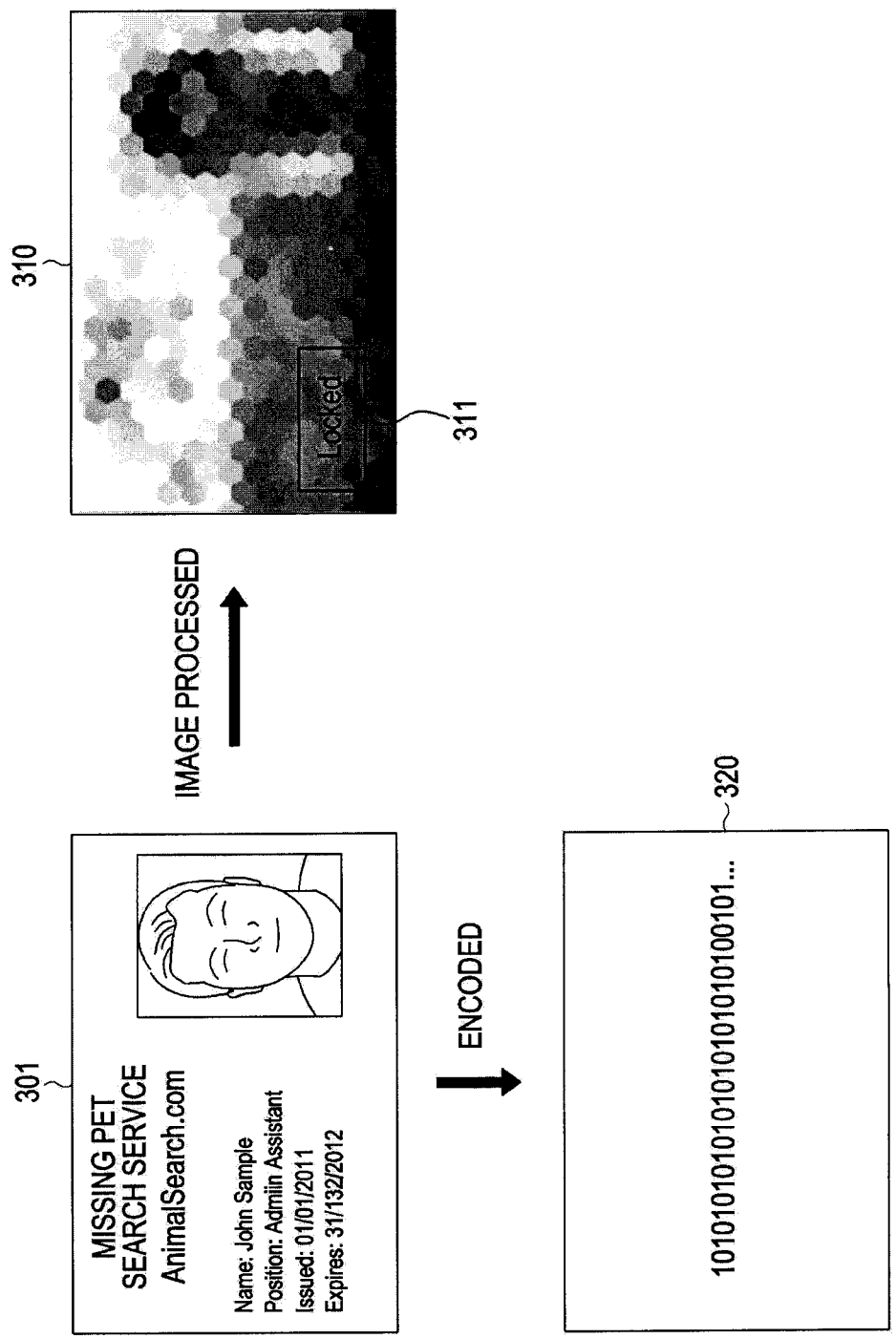
FIG. 3 is a view showing an example, of an image encoded by an electronic device in accordance with various embodiments of the present disclosure.

FIG. 3 is a view showing an example of an image encoded by an electronic device in accordance with various embodiments of the present disclosure.

Referring to FIG. 3, when receiving a request to transmit a first image 301, an electronic device can encode the first image 301 in a predetermined encoding method and control a sign for the first image 301 in accordance with the encoding method.

In accordance with various embodiments of the present disclosure, the first image 301 include information that should be protected from other users such as individual information, secret information, or information about private life, so the electronic device can control a sign for the first image 301 so that the image information cannot be recognized even if the first image 301 is opened by other users.

In accordance with various embodiments of the present disclosure, the electronic device can blur the first image 301 and put a sign showing that the image has been encoded into the first image 301. For example, the blurred image 310 is obtained by blurring the first image in accordance with a predetermined pixel value and may include a symbol (e.g. 'Locked') 311 showing that the image has been encoded.

In accordance with various embodiments of the present disclosure, when receiving a request to transmit the first image, the electronic device can transmit the blurred image 310 together with encoding information in response to the transmission request. For example, the encoding information 320, which is information for converting the blurred image 310 into the first image 301, may include encoded-or-not, encoding method, or key information.

Figure 4:
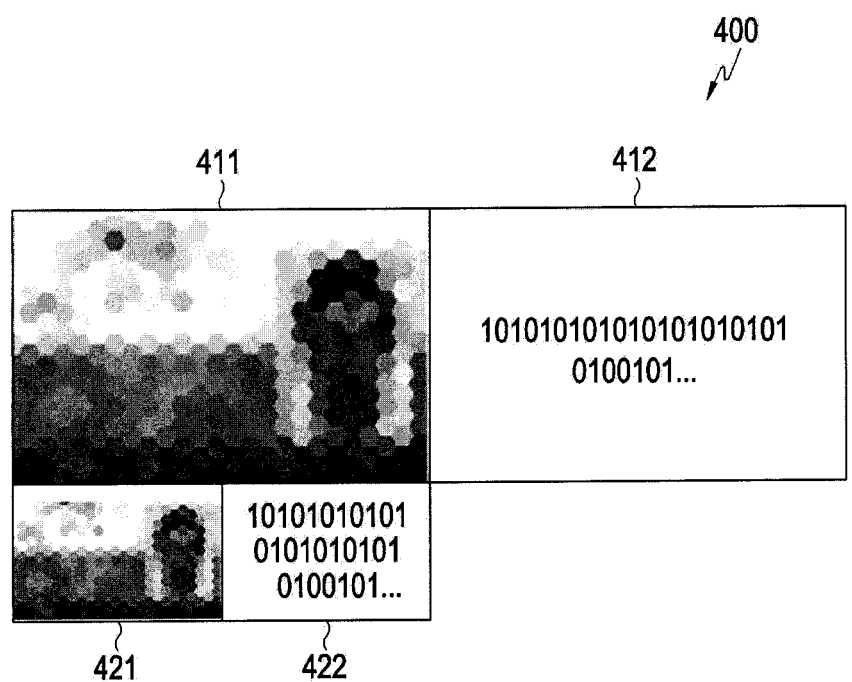
FIG. 4 is a view showing an example of an image transmitted from an electronic device in accordance with various embodiments of the present disclosure.

FIG. 4 is a view showing an example, of an image transmitted from an electronic device in accordance with various embodiments of the present disclosure.

Referring to FIG. 4, an image 400 to be transmitted may include a first image 411 blurred from an original image, first encoding information 412 of the first image 411, a second image 421 obtained by blurring a thumbnail image of the original image, or second encoding image 422 of the second image 421.

In accordance with various embodiments of the present disclosure, when receiving a request to transmit the original image, an electronic deice can transmit the first image 411 and the first encoding information 412 and can transmit the second image 421. For example, the second image 421, which has been changed in size, shape, or color etc. from the original image, may include an image to be used as a thumbnail image.

In accordance with various embodiments of the present disclosure, the second image 421 can be output to show that the original image was included, on an application image outputting the first image 411. For example, the second encoding information 422 of the second image 421 may be transmitted in response to a request to transmit the original image, and in this case, the second image 421 may be changed and output into the thumbnail image of the original image in accordance with security information of a user.

Figure 5:
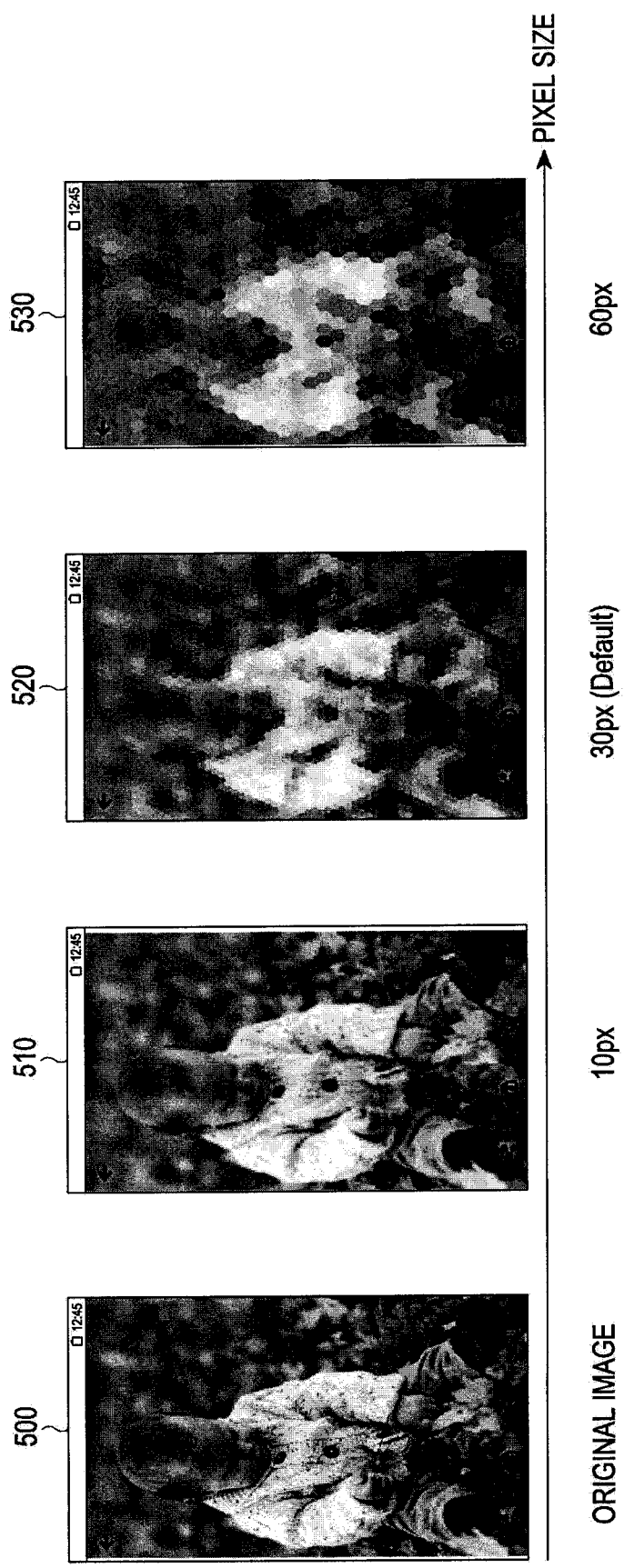
FIG. 5 is a diagram showing various examples of images blurred for each pixel size in accordance with various embodiments of the present disclosure.

FIG. 5 is a diagram showing various examples of images blurred for each pixel size in accordance with various embodiments of the present disclosure.

Referring to FIG. 5, an original image 500 is of a person, in which the person may have short blond hair, wearing a sweater and pants and sitting on leaves of a tree. For example, when the original image 500 is blurred with various pixels, the range from which a user can recognize the image may be different.

In accordance with various embodiments of the present disclosure, as for a first image 510 obtained by blurring the original image 500 with a small pixel size (e.g., 10 px), it is possible to recognize the facial expression of a person, and the clothes and pose of the photographed object, as compared with the original image 500. However, as for a third image 530 obtained by blurring the original image 500 with a large pixel size (e.g., 60 px), it may not be impossible to recognize whether the photographed object is a person or not and who the person is.

In accordance with various embodiments of the present disclosure, an electronic device can check the pixel value (e.g., 30 px) with which the original image 500 can be blurred so that the photographed object cannot be recognized by other users, even if the original image is opened, and can check the pixel value as a default. For example, as for a second image 520 blurred with 30 px, it may be possible to recognize that the photographed object is a person and recognize the positions of the hands, but who the person is may not be recognized by other users.

In accordance with various embodiments of the present disclosure, an electronic device can blur an image with information that allows for determining which object is taken in a picture stored by a user, and can protect the picture such that what the photographed object is cannot be recognized by other users even if the picture is opened.

Figure 6:
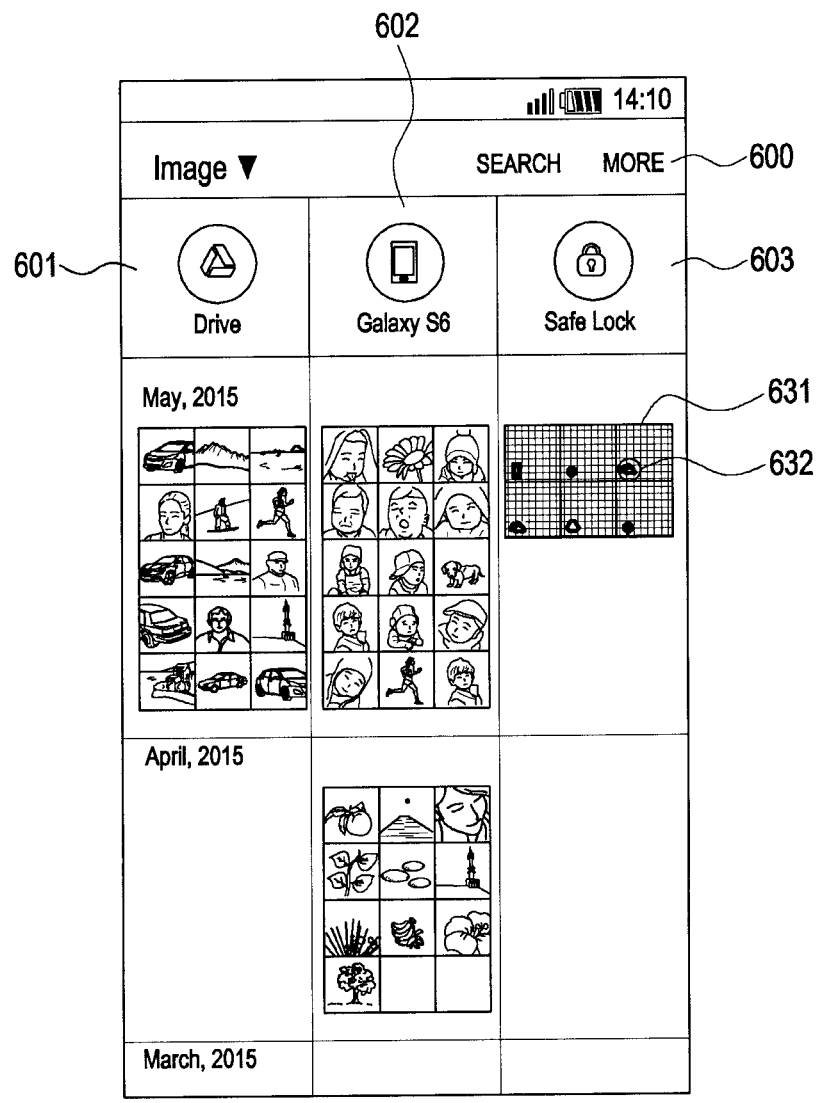
FIG. 6 is a view showing an example of an application image for outputting an image in accordance with various embodiments of the present disclosure.

FIG. 6 is a view showing an example of an application image for outputting an image in accordance with various embodiments of the present disclosure.

Referring to FIG. 6, an application image 600 can display at least one image group and images divided in the image groups. For example, the image group may include a group (e.g., 'drive' 601) of images transmitted from a cloud server, a group (e.g., 'galaxy s6' 602) of images transmitted from an electronic device, or an image group ('safe lock' 603) including encoded images.

In accordance with various embodiments of the present disclosure, in the image group 'safe lock' 603, a list of one or more encoded images can be output as thumbnail images (e.g., a first thumbnail image 631) of blurred images. For example, the first thumbnail image 631 may include a sign 632 showing the device that has transmitted the image or showing that the image has been encoded.

Figure 7:
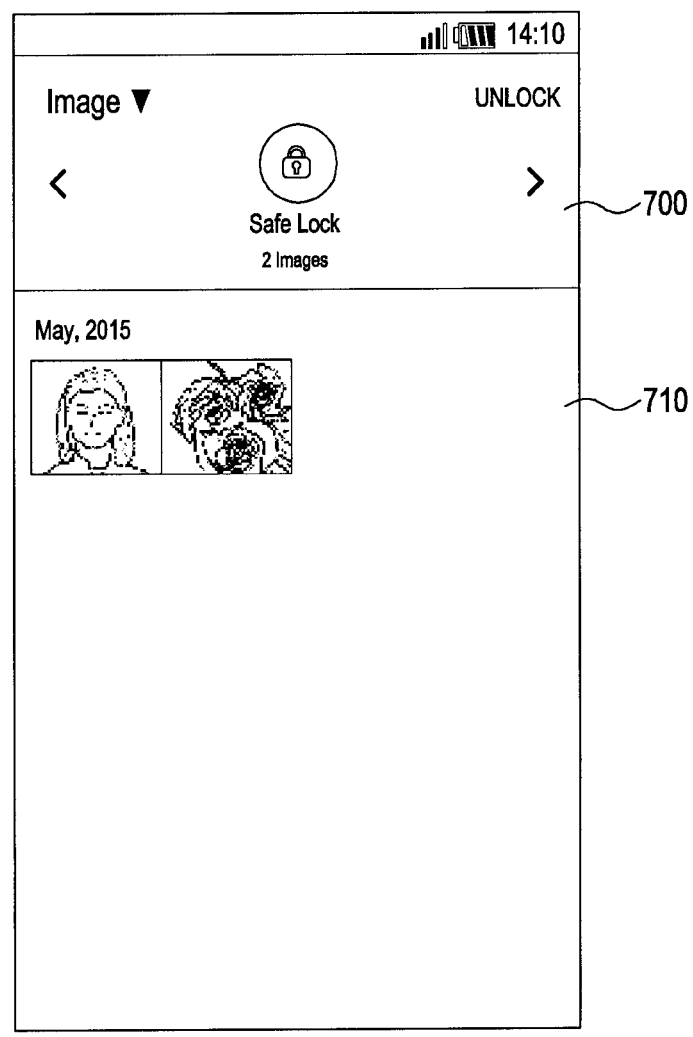
FIG. 7 is a view showing an example of an application image for outputting an image in accordance with various embodiments of the present disclosure.

FIG. 7 is a view showing an example of an application image for outputting an image in accordance with various embodiments of the present disclosure.

Referring to FIG. 7, when the group 'safe lock' is selected through the application, images 710 included in the selected image group can be output. For example, the images 710 that are output may have been blurred by encoding that uses security information of a user.

In accordance with various embodiments of the present disclosure, when one of the images 710 is selected, an electronic device can receive the security information of the user and can change and output the blurred image into the original image using the security information. For example, when the encoding information of the blurred image can be decoded using the security information, the original image can be output.

In accordance with various embodiments of the present disclosure, even if another user accesses the account storing the image and opens the stored image, the opened image may not be recognized by the another user because the opened image has been blurred.

Figure 8:
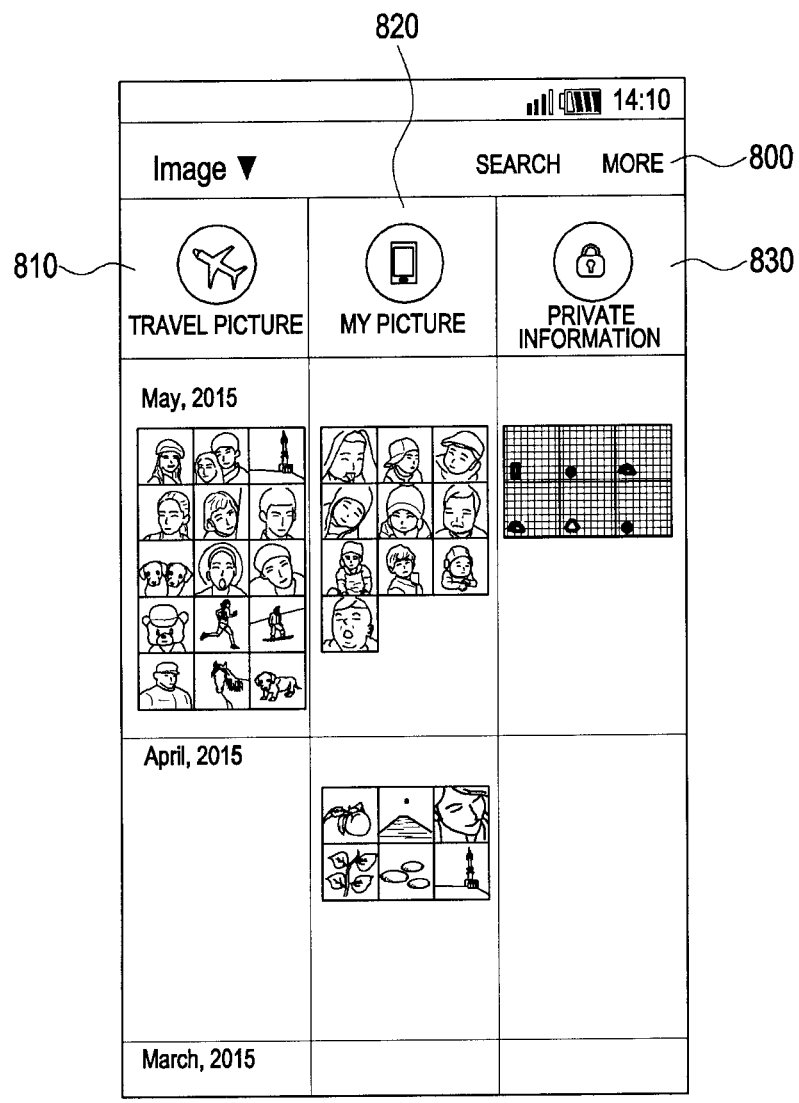
FIG. 8 is a view showing an example of an application image for outputting an image in accordance with various embodiments of the present disclosure.

FIG. 8 is a view showing an example of an application image for outputting an image in accordance with various embodiments of the present disclosure.

Referring to FIG. 8, an application image 800 can display at one or more image groups and images divided in the image groups. For example, image groups (e.g., travel picture group 810, my picture group 820, or individual information group 830) may be determined as image groups for images according to user's setting.

In accordance with various embodiments of the present disclosure, a user can encode at least one (individual group 830) of the image groups. For example, the images included in the encoded image group may be encoded as encoding information for the image group and may be blurred and output.

In accordance with various embodiments of the present disclosure, when an image group including specific images is encoded, the user can set the images included in the image group as the same security information even without encoding all the images.

Figure 9:
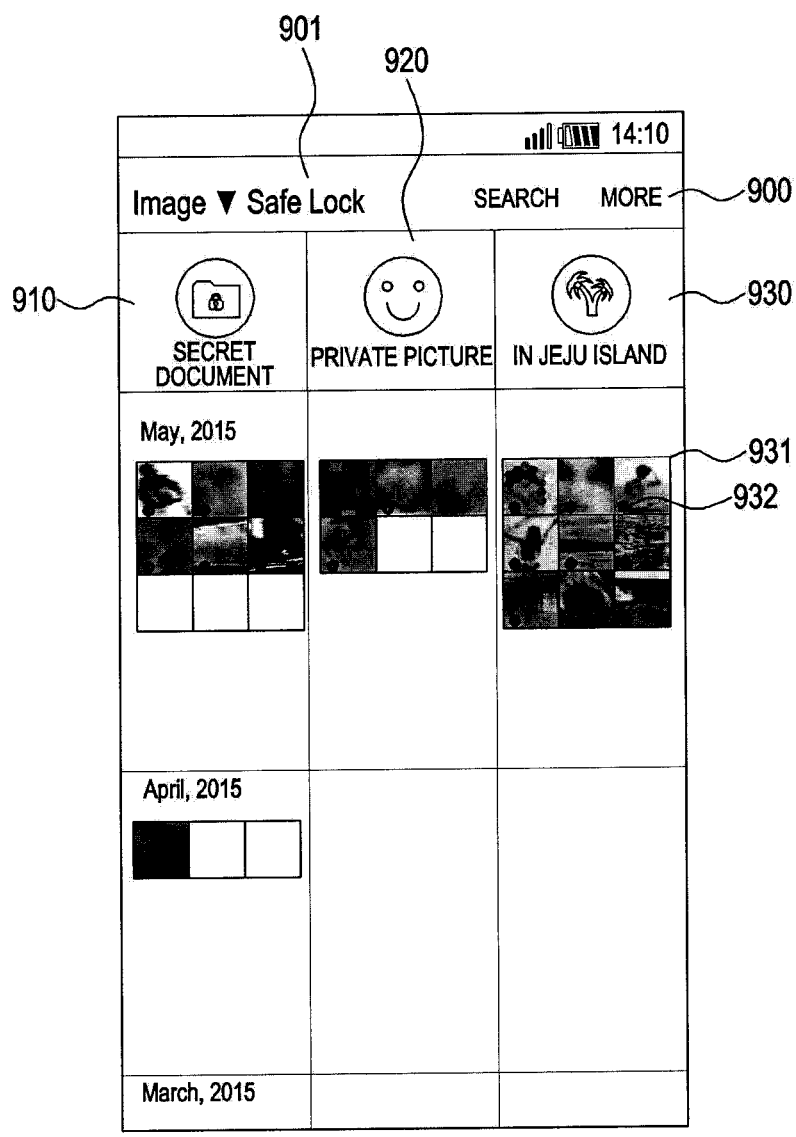
FIG. 9 is a view showing an example of an application image for outputting an image in accordance with various embodiments of the present disclosure.

FIG. 9 is a view showing an example of an application image for outputting an image in accordance with various embodiments of the present disclosure.

Referring to FIG. 9, an application image 900 can display one or more image groups and images divided in the image groups. For example, image groups (e.g., a secret document group 910, a private picture group 920, or an in-Jeju island group 930) may be determined as image groups for images according to metadata included in the images.

In accordance with various embodiments of the present disclosure, the metadata of an image may include encoding information, the position where the image has been taken, the type of the photographed object, etc. For example, an image including specific metadata (e.g., encoding information) may be included in a specific image group (e.g., secret document group 910).

In accordance with various embodiments of the present disclosure, an image group including specific metadata (e.g., private picture group 920) may be encoded in an electronic device. For example, the images included in the encoded image group can be encoded as encoding information designated for the metadata and can be output as blurred images through the execution image 800.

In accordance with various embodiments of the present disclosure, an electronic device can classify the images in accordance with metadata and a user can set the images including specific metadata as the same security information even without classifying the images in accordance with the photographed objects and the photographed positions.

Figure 10:
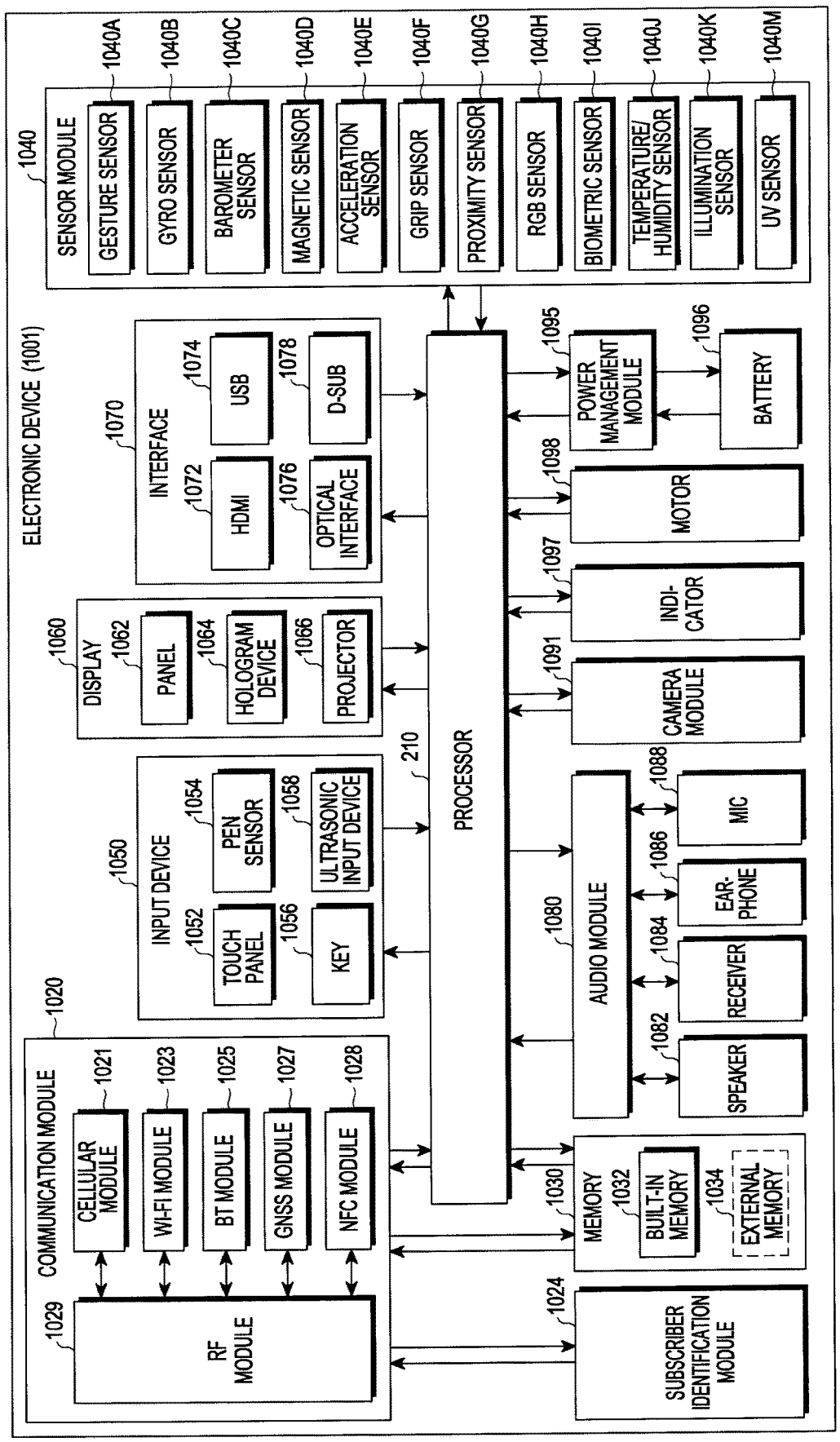
FIG. 10 is a block diagram showing an example of the configuration of an electronic device according to various embodiments of the present disclosure.

FIG. 10 is a block diagram showing an example of the configuration of an electronic device according to various embodiments of the present disclosure.

Referring to FIG. 10, an electronic device 1001, for example, may include the all or a portion of the electronic device 101 shown in FIG. 1. The electronic device 1001 may include one or more processors 1010 (for example, Application Processor (AP)), a communication module 1020, a subscriber identification module 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010, for example, can control a plurality of hardware or software components connected to the processor 1010 by operating an operating system or an application and can perform processing and calculation on various data. The processor 1010, for example, may be a System on Chip (SoC). According to an embodiment, the processor 1010 may further include a Graphic Processor (GPU) and/or an image signal processor. The processor 1010 may include at leas some (a cellular module 1021) of the components shown in FIG. 10. The processor 1010 can load and process commands or data received from other components (for example, a nonvolatile memory) on a volatile memory and can store various data on a nonvolatile memory.

The communication module 1020 may have a configuration the same as or similar to that of the communication module 170 shown in FIG. 1. The communication module 1020, for example, may include a cellular module 1021, a WiFi module 1023, a Bluetooth module 1025, a GNSS module 1027 (e.g., a GPS module, a Glonass module, a Beidou module, or a Galileo module), an NFC module 1028, and an RF module 1029.

The cellular module 1021, for example, can provide a voice call, a video call, a text service, or an internet service through a network. According to an embodiment, the cellular module 1021 can identify and authenticate the electronic device 1001 in a communication network, using a subscriber identification module 1024 (for example, a SIM card). According to an embodiment, the cellular module 1021 can perform at least some of the functions that the processor 1010 can provide. According to an embodiment, the cellular module 1021 may include a Communication Processor (CP).

The WiFi module 1023, Bluetooth module 1025, GNSS module 1027, or NFC module 1028, for example, may include a processor for processing data transmitted through the module. According to another embodiment, at least some (for example, two or more) of the cellular module 1021, WiFi module 1023, Bluetooth module 1025, GNSS module 1027, and NFC module 1028 may be included in one Integrated Chip (IC) or IC package.

The RF Module 1029, for example, can transmit and receive communication signals (for example, RF signals). The RF module 1029, for example, may include a transceiver, a Power Amp Module (PAM), a frequency filter, a Low Noise Amplifier (LNA), or an antenna. According to another embodiment, at least one of the cellular module 1021, WiFi module 1023, Bluetooth module 1025, GNSS module 1027, and NFC module 1028 can transmit and receive RF signals through a separate RF module.

The subscriber identification module 1024, for example, may include a card including a subscriber identification module and/or an embedded SIM and may include unique identification information (for example, Integrated Circuit Card Identifier (ICCID) or subscriber information (for example, International Mobile Subscriber Identity (IMSI)).

The memory 1030 (e.g., the memory 130), for example, may include a built-in memory 1032 or an external memory 1034. The built-in memory 1032, for example, may include at least one of a volatile memory (e.g., a Dynamic RAM (DRAM) or a Synchronous Dynamic RAM (SDRAM)) and a nonvolatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash or NOR flash), a hard drive, or a Solid State Drive (SSD).

The external memory 1034 may further include a flash drive, for example, a Compact Flash (CF), a Secure Digital (SD), a Micro Secure Digital (Micro-SD), a Mini Secure Digital (Mini-SD), an Extreme Digital (xD), a Multi-Media Card (MMC), or a memory stick. The external memory 1034 can be functionally and/or physically connected to the electronic device 1001 through various interfaces.

The sensor module 1040, for example, can measure physical quantities or sense operation states of the electronic device 1010 and can convert the measured or sensed information into electrical signals. The sensor module 1040, for example, may include at least one of a gesture sensor 1040A, a gyro sensor 1040B, a barometer sensor 1040C, a magnetic sensor 1040D, an acceleration sensor 1040E, a grip sensor 1040F, a proximity sensor 1040G, a color sensor 1040H (e.g., an RGB (red, green, blue) sensor), a biosensor 1040I, a temperature/moisture sensor 1040J, an illumination sensor 1040K, an Ultra violet (UV) sensor 1040L, and a touch sensor 1040M. Further or alternatively, the sensor module 1040, for example, may include an e-nose sensor, an Electromyography (EMG) sensor, an Electroencephalogram (EEG) sensor, an Electro-cardiogram (ECG) sensor, an Infrared (IR) sensor, an iris sensor, and/or a fingerprint sensor. The sensor module 1040 may further include a control circuit for controlling one or more sensors therein. In another embodiment, the electronic device 1001 may further include a processor configured to control the sensor module 1040, separately or as a part of the processor 1010, whereby it is possible to control the sensor module 1040 while the processor 1010 is in a sleep state.

The input device 1050, for example, may include a touch panel 1052, a (digital) pen sensor 1054, a key 1056, or an ultrasonic input device 1058. The touch panel 1052, for example, may use at least one of electrostatic, decompressing, infrared, and ultrasonic methods. The touch panel 1052 may further include a control circuit. The touch panel 1052 can provide a touch response to a user by further including a tactile layer.

The (digital) pen sensor 1054, for example, may include a recognition sheet that is a part of the touch panel or a separate part. The key 1056, for example, may include a physical button, an optical button, or a keypad. The ultrasonic input device 1058 can sense an ultrasonic wave generated from an input tool through a microphone (for example, a microphone 1088) and find data corresponding to the sensed ultrasonic wave.

The display 1060 (e.g., a display 160) may include a panel 1062, a hologram device 1064, or a projector 1066. The communication module 1062 may have a configuration the same as or similar to that of the display 160 shown in FIG. 1. The panel 1062, for example, may be implemented to be flexible, transparent, or wearable. The panel 1062 may be configured as one or modules together with the touch panel 1052. The hologram device 1064 can show 3D images in the air, using interference of light. The projector 1066 can show images by projecting light to a screen. The screen, for example, may be positioned inside or outside the electronic device 1001. According to an embodiment, the display 1060 may further include a circuit for controlling the panel 1062, hologram device 1064, or projector 1066.

The interface 1070, for example, may include a High-Definition Multimedia Interface (HDMI) 1072, a Universal Serial Bus (USB) 1074, an optical interface 1076, or a D-subminiature (D-sub) 1078. The interface 1070, for example, may be included in the communication module 170 shown in FIG. 1. Additionally or alternatively, the interface 1070, for example, may include a Mobile High-definition Link (MHL) interface, a Secure Digital (SD) card/Multi-Media Card (MMC) interface, or an interface under Infrared Data Association (IrDA).

The audio module 1080, for example, can convert a sound and an electrical signal into each other. At least some components of the audio module 1080, for example, may be included in the I/O interface 150 shown in FIG. 1. The audio module 1080, for example, can process sound information input or output through a speaker 1082, a receiver 1084, an earphone 1086, or a microphone 1088.

The camera module 1091, for example, is a device that can take still images and moving images, and according to an embodiment, the camera module 291 may include one or more image sensors (for example, front sensors or rear sensors), lenses, Image Signal Processors (ISP), or flashes (for example, LEDs or xenon lamps).

The power management module 1095, for example, can manage power of the electronic device 1001. According to an embodiment, the power management module 1095 may include a Power Management Integrated Circuit (PMIC), a charging Integrated Circuit (IC), or a battery or a fuel gauge. The PMIC may have a wire and/or wireless charging method. The wireless charging method, for example, includes magnetic resonance method, a magnetic induction method, or an electromagnetic wave method, and may further include an additional circuit for wireless charging, for example, a coil loop, a resonant circuit, or a rectifier. The battery gauge, for example, can measure the remaining capacity, a voltage in charging, a current, or temperature of a battery 1096. The battery 1096, for example, may include a rechargeable battery and/or a solar battery.

The indicator 1097 can show specific statuses such as a booting status, a message status, or a charging status of the electronic device 1001 or some (for example, the processor 1010) of the electronic device 1001. The motor 1098 can convert electrical signals into mechanical vibration and can generate vibration or a haptic effect. Though not shown in the figures, the electronic device 1001 may include a processor (e.g., a GPU) for supporting a mobile TV. The processor for supporting a mobile TV, for example, can process media data under standards such as Digital Multimedia Broadcasting (DMB), Digital Video Broadcasting (DVB), or mediaFlo™.

Each of the above-described component elements of hardware according to the present disclosure may be configured with one or more components, and the names of the corresponding component elements may vary based on the type of electronic device.

In various embodiments of the present disclosure, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 11:
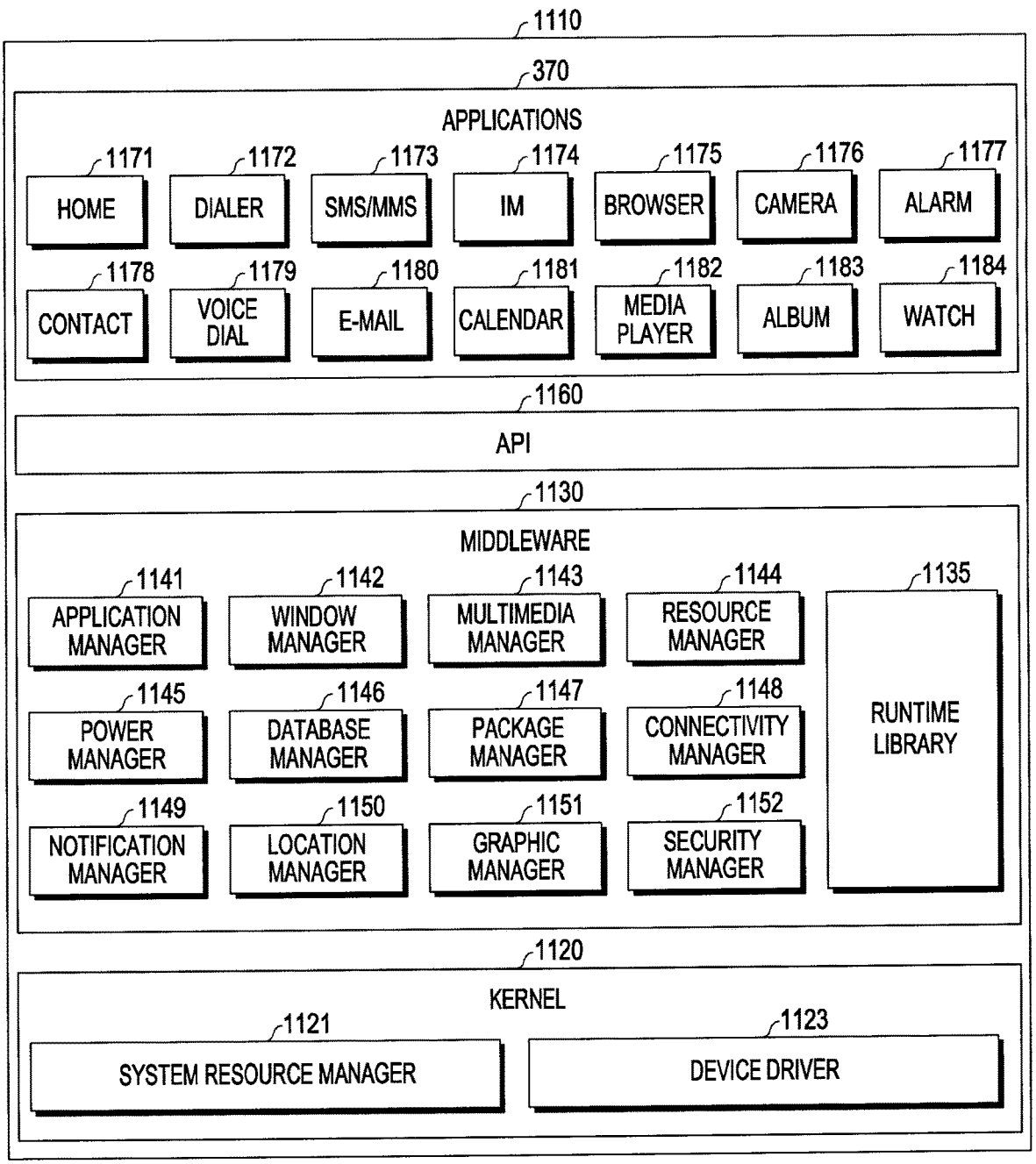
FIG. 11 is a block diagram showing an example of the configuration of a program module structure according to various embodiments of the present disclosure.

FIG. 11 is a block diagram showing an example of the configuration of a program module structure according to various embodiments of the present disclosure.

According to an embodiment, a program module 1110 (e.g., the program 140) may include an Operating System (OS), which controls resources related to an electronic device (e.g., the electronic device 101), and/or various applications (e.g., the application program 147) that are executed on an operating system.

The OS may be, for example, android, IOS, Windows, Symbian, Tizen, or Bada.

The program 1110 may include a kernel 1120, a middleware 1130, an Application Programming Interface (API) 1160, and/or an application 1170. At least a portion of the program module 1110 can be pre-loaded on an electronic device or can be downloaded from an external electronic device (for example, the electronic devices 102 and 104 and the server 106).

The kernel 1120 (e.g., the kernel 141), for example, may include a system resource manager 1121 and/or a device driver 1123. The system resource manager 1121 can control, allocate, or recover etc. system resources. According to an embodiment, the system resource manager 1121 may include a process manager, a memory manager, or a file system manager etc. The device driver 1123, for example, may include a display driver, a camera driver, a Bluetooth driver, a shared memory driver, a USB driver, a keypad driver, a WiFi driver, an audio driver, or an Inter-Process Communication (IPC) driver.

The middleware 1130, for example, can provide functions that all of the applications 1170 need, or can provide various functions to the applications 1170 through the API 1160 so that the application 1170 can efficiently use limited system resources in the electronic device. According to an embodiment, the middleware 1130 (e.g., the middleware 143) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, or a security manager 1152.

The runtime library 1135, for example, may include a library module that is used by a compiler to add new functions, using a programming language while the application 1170 is executed. The runtime library 1135 can perform input/output management, memory management, or functions about a calculation function.

The application manager 1141, for example, can manage the life cycle of at least one of applications 1170. The window manager 1142 can manage a GUI resource that is used for the screen. The multimedia manager 1143 can find the formats for playing various media files and can encode or decode the media files, using codecs corresponding formats. The resource manager 1144 can manage resources such as the source code, memory, or storage space for at least one of the applications 1170.

The power manager 1145, for example, can manage a battery or power by operating with a Basic Input/Output System (BIOS) and can provide power information for the operation of an electronic device. The database manager 1146 can create, search for, or change a database that can be used by at least one of the applications 1170. The package manager 1147 can manage installation or update of applications that are released in the type of a package file.

The connectivity manager 1148, for example, can manage wireless connection such as WiFi or Bluetooth. The notification manager 1149 can show or notify events such as showing arrival message, a promise, or approach in a way not interfering with a user. The location manager 1150 can manage the location information of an electronic device. The graphic manager 1151 can manage a graphic effect to be provided to a user or a user interface related to the graphic effect. The security manager 1152 can provide all security functions for system security or user authentication. According to an embodiment, when an electronic device (e.g., the electronic device 101) has a telephone function, the middleware 1130 may further include a telephony manager for managing voice or vide telephony) of the electronic device.

The middleware 1130 may include a middleware module for combining various functions of the components described above. The middleware 1130 can provide modules specified for the types of operating systems to provide different functions. The middleware 1130 can dynamically delete some of existing component or add new components.

The API 1160 (e.g., the API 145) may be provided to have different configurations, depending on operating systems, as a set of API programming functions. For example, for Android or iOS, one API set can be provided for each platform, and for Tizen, two or more API sets can be provided for each platform.

The application 1170 (e.g., the application program 147) may include one or more applications that can perform functions of a home 1171, a dialer 1172, an SMS/MMS 1173, an Instant Message (IM) 1174, a browser 1175, a camera 1176, an alarm 1177, contact 1178, voice dial 1179, an email 1180, a calendar 1181, a media player 1182, an album 1183, a watch 1184, and a healthcare (for example, measuring the amount of exercise or blood sugar) or environment information (for example, atmospheric pressure, humidity, or temperature information) provider.

According to an embodiment, the applications 1170 may include an application (hereafter, referred to as an "information exchange application") supporting information exchange between an electronic device (e.g., the electronic device 101) and an external electronic device (e.g., the electronic devices 102 and 104). The information exchange application, for example, may include a notification relay application for transmitting specific information to an external electronic device or a device management application for managing an external electronic device.

For example, the notification relay application may have a function that transmits notification information generated by another application (e.g., an SMS/MMS application, an email application, a healthcare application, or an environmental information application) of an electronic device to an external electronic device (e.g., the electronic devices 102 and 104). The notification relay application, for example, can receive notification information from an external electronic device and provide the notification information to a user.

The device management application, for example, can manage (e.g., install, delete, or update) at least one function (e.g., turning on/off an external electronic device (or some components) or adjusting the brightness of a display) of an external electronic device (e.g., the electronic devices 102 and 104) that communicates with an electronic device, and services (e.g., a telephone service or a message service) that are provided by an application operating in an external electronic device or by an external electronic device.

According to an embodiment, the applications 1170 may include an application (e.g., a healthcare application of a mobile medical device) designated in accordance with the property of an external electronic device (e.g., the electronic devices 102 and 103). According to an embodiment, the applications 1170 may include an application received from an external electronic device (e.g., the server 106 or the electronic devices 102 and 104). According to an embodiment, the applications 1170 may include a preloaded application or a third party application that can be downloaded from a server. The names of the components of the program module 1110 according to the embodiments shown in the drawings may depend on the types of operating systems.

According to various embodiments of the present disclosure, at least a portion of the program module 1110 may be achieved by software, firmware, hardware, or a combination of two or more of them. At least a portion of the program module 1110, for example, may be implemented (e.g., executed) by a processor (e.g., the processor 1010). At least a portion of the program module 1110 may include, for example, a module, a program, a routine, a set of instructions, or a process for performing one or more functions.

Figure 12:
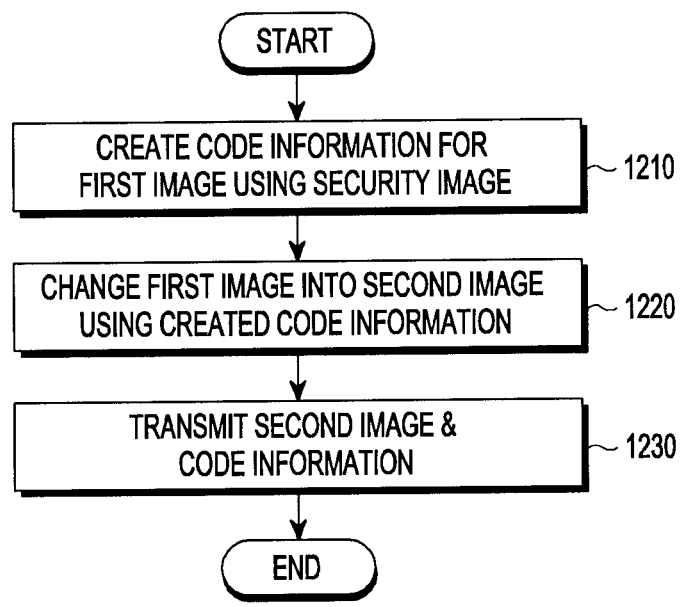
FIG. 12 is a flowchart showing an example of processing an image in an electronic device in accordance with various embodiments of the present disclosure.

FIG. 12 is a flowchart showing an example of processing an image in an electronic device in accordance with various embodiments of the present disclosure.

Referring to FIG. 12, in operation 1210, an electronic device can create code information about a first image using security information. For example, the code information may include an encoding key created using the security information, whether the first image has been encoded or not, or an encoding method that is used for decoding the encoding key.

In operation 1220, the electronic device can change the first image into a second image, using the created code information. For example, the second image may include an image mosaicked or blurred from the first image.

In operation 1230, the electronic device can transmit the second image and the code information in response to a request to transmit the first image.

Figure 13:
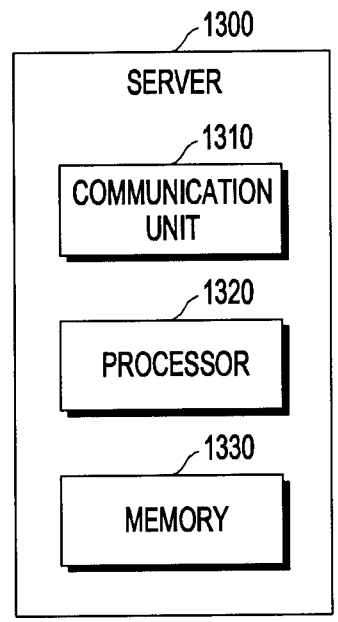
FIG. 13 is a block diagram showing an example of the configuration of a server that processes images in accordance with various embodiments of the present disclosure.

FIG. 13 is a block diagram showing an example of the configuration of a server that processes images in accordance with various embodiments of the present disclosure.

Referring to FIG. 13, a server 1300 may include a communication unit 1310, a processor 1320, or a memory 1330.

The communication unit 1310 can receive an encoded image and encoding information for decoding the encoded image from an external electronic device.

When input for selecting a stored image is received, the processor 1320 can check security information input from a user and change and output the selected image into an original image. For example, the processor 1320 can find the original image of the selected image by processing the security information through a predetermined program and then decoding the encoding information of the selected image using the processed security information.

The memory 1330 can store received images and encoding information of each of the images. For example, the memory 1330 can store an instruction for changing security information input from a user and determining whether the changed security information corresponds to security information used for creating encoding information through the processor 1320.

Figure 14:
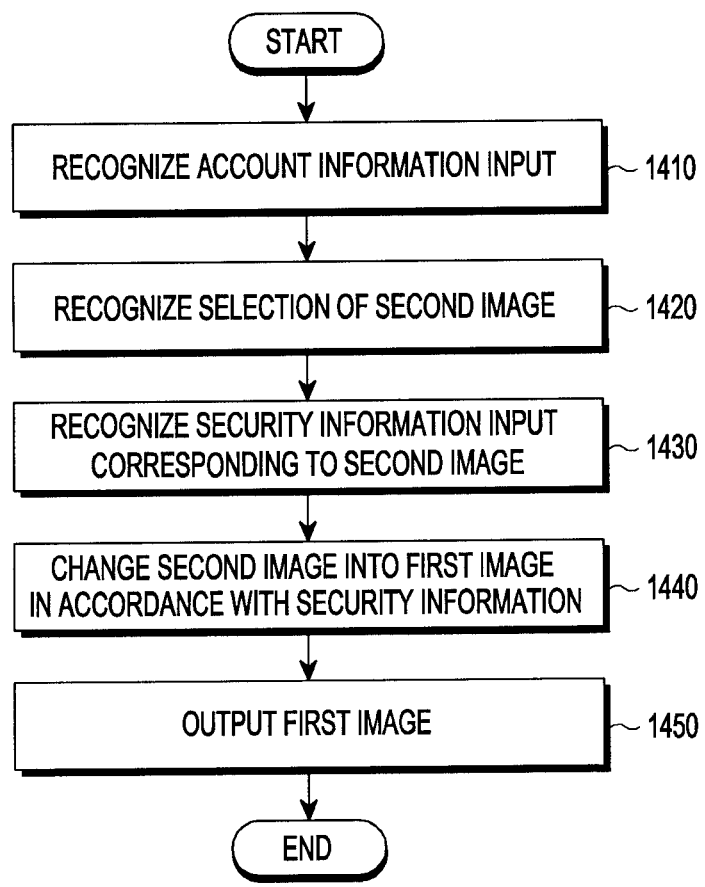
FIG. 14 is a flowchart showing an example of operation for processing an image in a server in accordance with various embodiments of the present disclosure.

FIG. 14 is a flowchart showing an example of operation for processing an image in a server in accordance with various embodiments of the present disclosure.

Referring to FIG. 14, in operation 1410, a server can recognize that account information is input.

In operation 1420, the server can recognize that a second image of stored images is selected. For example, the second image may be an image blurred and output by encoding.

In operation 1430, the server can recognize whether security information corresponding to the second image is input.

In operation 1440, the server can change the second image into a first image in accordance with the input security information. The first image is the original image of the second image, and when the input security image is valid, the first image may be an image decoded from the blurred second image using the security information.

In operation 1450, the server can output the first image.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

The programming module according to the present disclosure may include one or more of the aforementioned components or may further include other additional components, or some of the aforementioned components may be omitted.

The operations performed by the modules, programming module, or other elements according to various embodiments of the present disclosure may be executed in a sequential, parallel, repetitive, or heuristic manner. Furthermore, some operations may be executed in a different order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic device comprising:
a display;
a processor; and
a memory operatively coupled to the processor,
wherein the memory stores instructions executable by the processor to cause the electronic device to:
generate code information for a first image using security information of a user,
generate a second image based on the first image using the generated code information, the second image distorting an entirety of the first image,
transmit the second image and the code information in response to a request to transmit the first image,
generate a thumbnail of the first image including the distorting of the entirety of the first image,
display a gallery divided in multiple sub-regions including a safe-lock sub-region for encoded images,
after generating the image and prior to transmission of the second image, overlay on the thumbnail a first icon indicating that encoding has been performed on the first image, and
after transmitting the second image, changing the overlay on the thumbnail from the first icon to a second icon indicating that the second image is transmitted.

2. The electronic device of claim 1, wherein the security information includes at least one of biological information, a password, and pattern information.

3. The electronic device of claim 1, wherein the code information includes at least one of information showing whether the first image has been encoded, an encoding method, and an encoding key.

4. The electronic device of claim 3, wherein the distorting the entirety of the first image includes mosaicking or blurring the first image, depending on the encoding method.

5. The electronic device of claim 1, wherein the instructions are executable by the processor to:
retrieve a first thumbnail image of the first image; and
generate a second thumbnail image using second encoding information for the first thumbnail image,
wherein the second thumbnail image and the second encoding information are included in the second image when the code image is transmitted in response to the request to transmit the first image.

6. The electronic device of claim 1, wherein the processor changes the first image into the second image by recognizing a first image group that the first image belongs to and
determining whether the security information of a user corresponds to code information set for the first image group.

7. The electronic device of claim 6, wherein the image group includes at least one image classified in accordance with metadata included in the image or user's setting, and
the processor sets code information of the image group for at least one image included in the image group.

8. The electronic device of claim 1, wherein the processor outputs the second image with a sign including an icon overlaying the second image, indicating that encoding has been performed.

9. A method for an electronic device, comprising:
generating, by a processor, code information for a first image using security information of a user;
generating a second image based on the first image using the generated code information, the second image distorting an entirety of the first image;
transmitting, by communication circuitry, the second image and the code information to an external electronic device in response to a request to transmit the first image;
generating a thumbnail of the first image including the distorting of the entirety of the first image;
displaying a gallery divided in multiple sub-regions including a safe-lock sub-region for encoded images;
after generating the image and prior to transmission of the second image, overlaying on the thumbnail a first icon indicating that encoding has been performed on the first image; and
after transmitting the second image, changing the overlay on the thumbnail from the first icon to a second icon indicating that the second image is transmitted.

10. The method of claim 9, wherein the security information includes at least one of biological information, a password, and pattern information.

11. The method of claim 9, wherein the code information includes at least one of information showing whether the first image has been encoded, an encoding method, and an encoding key, and
wherein the distorting the entirety of the first image includes mosaicking or blurring the first image, depending on the encoding method.

12. The method of claim 9, further comprising:
retrieving a first thumbnail image of the first image; and
generating a second thumbnail image using second encoding information for the first thumbnail image,
wherein the second thumbnail image and the second encoding information are included in the second image when the code image is transmitted in response to the request to transmit the first image.

13. The method of claim 9, further comprising:
recognizing a first image group that the first image belongs to;
determining whether the security information of a user corresponds to code information set for the first image group; and
changing the first image into the second image in accordance with the determination result.

14. The method of claim 13, wherein the image group includes at least one image classified in accordance with metadata included in the image or user's setting, and the method further comprises setting code information of the image group for at least one image included in the image group.

15. The method of claim 9, further comprising outputting the second image with a sign including an icon overlaying the second image, indicating that encoding has been performed.

\* \* \* \* \*